Nov. 21, 1939.　　　　L. JENSEN　　　　2,180,903

FEEDING AND ALIGNING MECHANISM FOR A CUTTING DEVICE

Filed Jan. 27, 1938　　　3 Sheets-Sheet 3

Inventor:
Louis Jensen.
By Chritton, Wiles, Davis, Hirsch & Dawson.
Attys.

UNITED STATES PATENT OFFICE 2,180,903

FEEDING AND ALIGNING MECHANISM FOR A CUTTING DEVICE

Louis Jensen, Chicago, Ill., assignor to United Autographic Register Co., a corporation of Illinois Application January 27, 1938, Serial No. 187,287

7 Claims. (Cl. 164—68)

This invention relates to an improved feeding and aligning mechanism, and more particularly to an improved mechanism for automatically advancing and registering a strip of stationery into register with a knife edge so as to enable a predetermined length of material to be cut off during each operation of the machine.

The primary object of the invention is to provide a machine for accurately cutting up a strip or a plurality of strips into predetermined form lengths.

A further object of the invention is to obtain extremely accurate registrations of the stationery with respect to the cutting edge of the machine by utilizing registering mechanism which operates on portions of the register perforations, provided in the stationery, that are not likely to have been damaged in previous operations on the stationery. This is accomplished in the present invention by advancing the stationery beyond the position desired over the cutting edge and then retracting the stationery, without putting it under tension, to the desired position.

The present machine is particularly useful in cutting up strips of pay checks, for example, that previously have been fed through tabulating machines, typewriters, or the like, embodying feeding means which has a tendency to tear or damage the front end of the register perforations.

Figure 1:
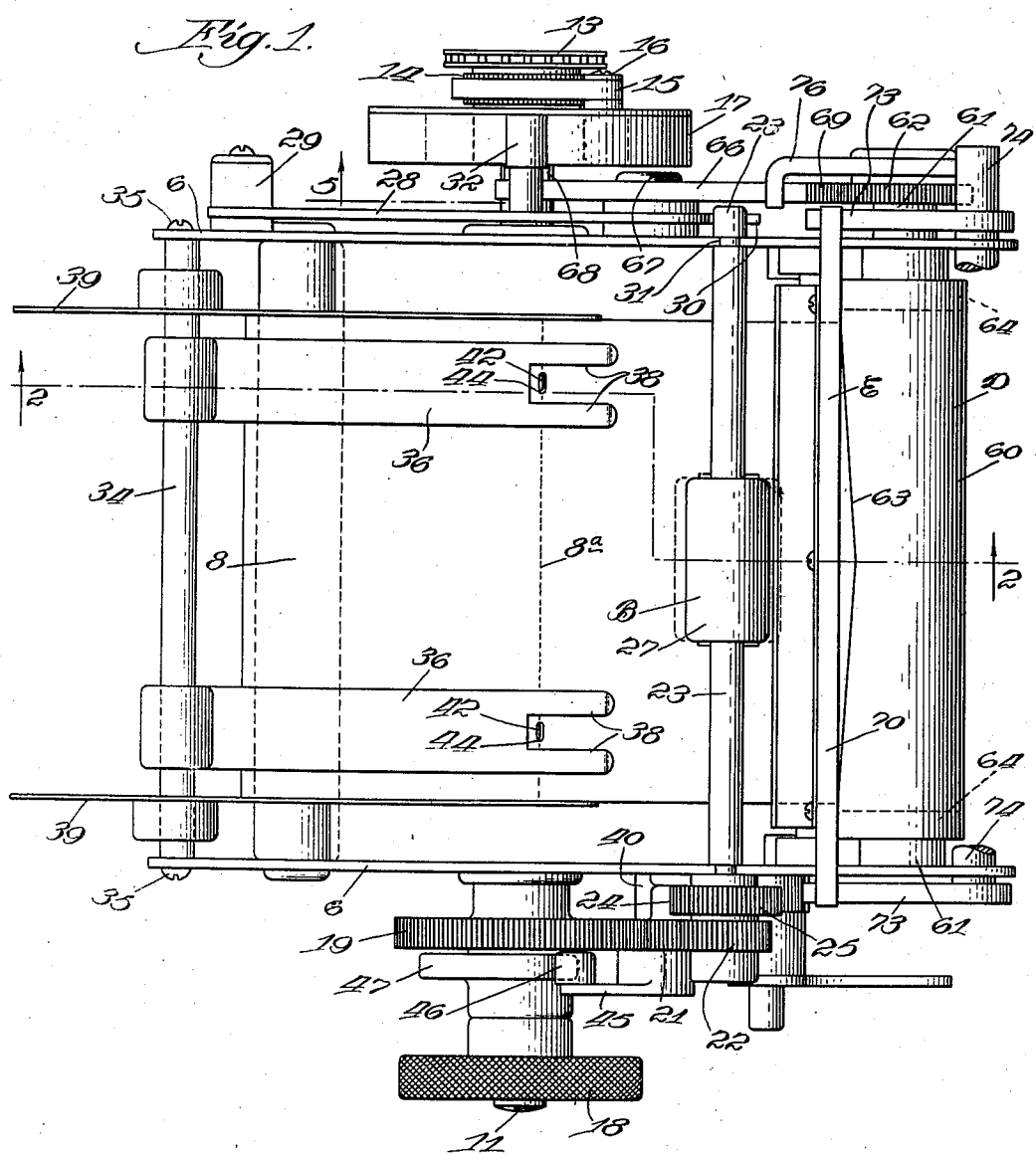
Figure 2:
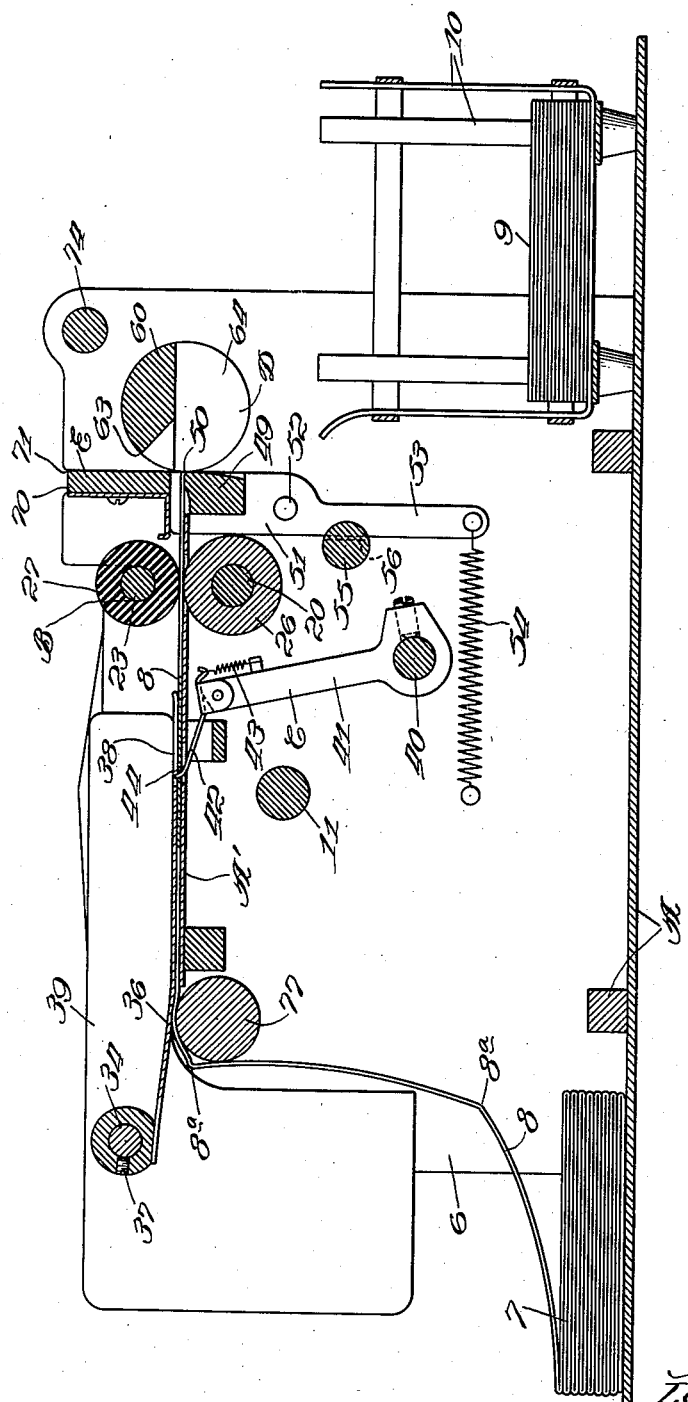
Figure 3:
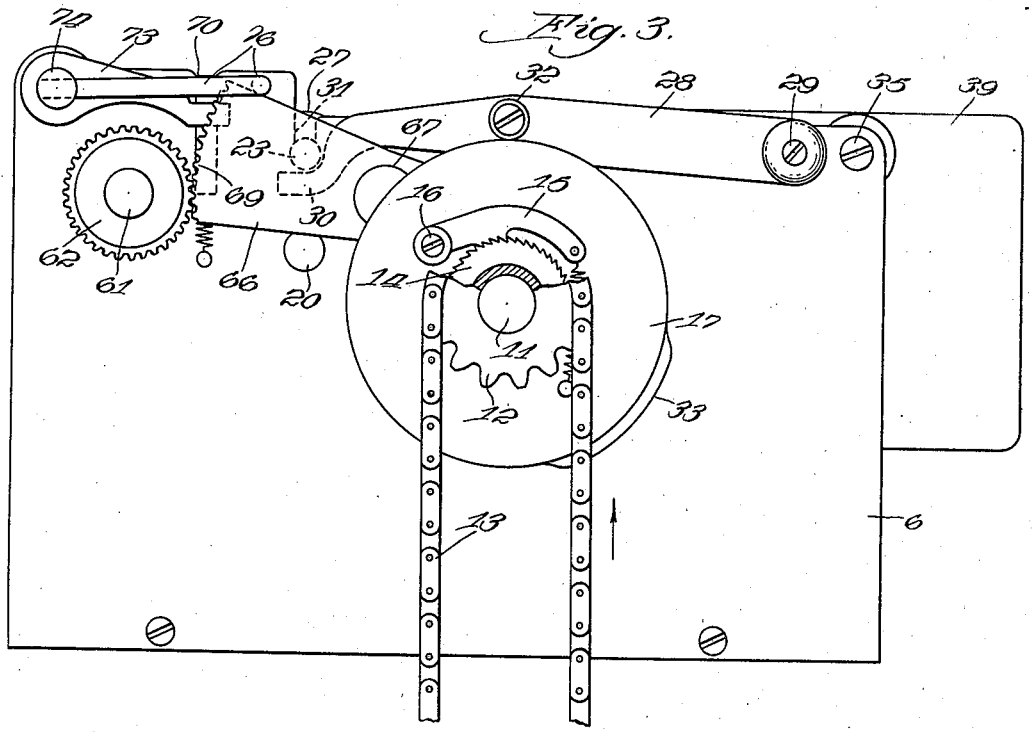
Figure 4:
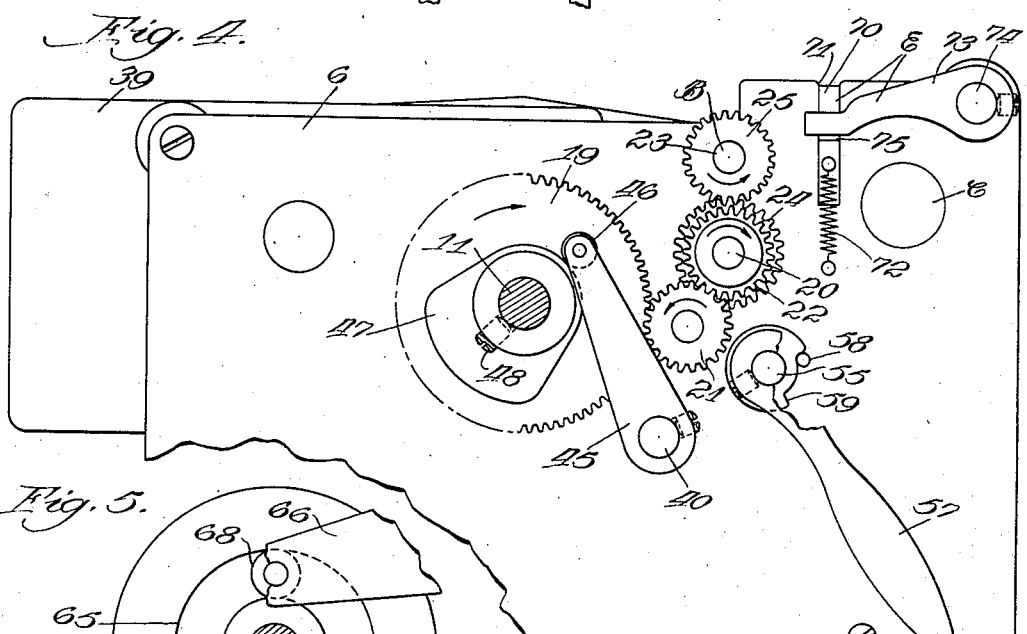
Figure 5:
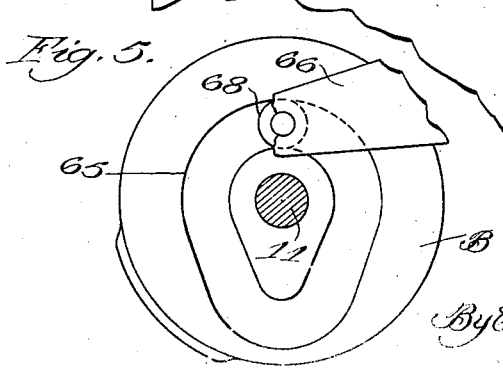

The invention is illustrated in a preferred embodiment in the accompanying drawings, in which:

Figure 1 is a broken plan view of a machine embodying the invention; Fig. 2, a longitudinal sectional view of the same, taken as indicated at line 2—2 of Fig. 1; Fig. 3, a fragmentary side elevational view of the machine, showing the sprocket chain for driving the machine; Fig. 4, a fragmentary side elevational view of the opposite side of the machine from Fig. 3; and Fig. 5, a fragmentary sectional view, taken as indicated at line 5 of Fig. 1.

In the embodiment illustrated, A designates the main frame of the machine which is provided with a table-like top A'; B, feed-mechanism for advancing a stationery strip over the table A'; C, aligning mechanism for retracting the stationery into register after the feed-mechanism B has released its grip thereon; D, cutting mechanism; and E, a clamping bar for holding the stationery during a cutting operation.

The frame A may be of any suitable construction and is shown with side walls 6 which support the table A' and in which are journalled various cross shafts. As shown in Fig. 2, a supply packet 7 of stationery is rested on the base of the frame and a zigzag folded strip of stationery 8 may be led over the table A' to the cutting mechanism D. Severed slips 9 drop into a basket-like container 10 also resting on the base of the frame and disposed in front of and below the cutting mechanism.

A main power shaft 11 is provided with a sprocket wheel 12 which is driven continuously by sprocket chain 13 from an electric motor (not shown). The inner portion of the sprocket wheel 12 is provided with a ratchet wheel 14 which is adapted to be engaged by a pawl 15 which is pivotally mounted, as indicated at 16, on a cam wheel 17. One end of the shaft is provided with a hand wheel 18 to facilitate manual rotation of the shaft 11.

As best shown in Fig. 4, the driving shaft 11 is provided with a gear 19 which drives the lower feed roll shaft 20 by means of gears 21 and 22. An upper feed roll shaft 23 is driven from the lower feed roll shaft by means of gears 24 and 25 so that the feed rolls 26 and 27 will rotate at the same peripheral speed. As shown in Fig. 2, the lower feed roll extends upwardly through a slot in the table A' so as to contact the lower side of the strip 8 and cooperate with the upper presser roll 27 to feed the stationery through the machine.

In order to release the pressure between the feed rolls during an aligning operation, a rock arm 28 is pivotally mounted on one of the side walls 6, as indicated at 29, and has a forwardly and downwardly extending finger 30 which extends beneath one end of the upper feed roll shaft 23. This end of the feed roll shaft is journalled in a slot 31 so that the shaft may be raised by the rock arm 28. The rock arm is provided with a roller 32 which rides on the cam 17 so as to be raised by the projection 33.

As shown in Figs. 1 and 2, a cross bar 34 is fixed to the side wall members by means of screws 35 and serves to support a pair of forwardly extending leaf-spring presser members 36 which lightly press the strip 8 against the table A'. Tension may be applied by angular adjustment through the set screws 37. The front ends of the presser members 36 are slotted, to avoid interference with the aligning fingers, as indicated at 38. Also, as indicated in Fig. 1, a pair of lateral guide members 39 are supported on the cross bar 34 to hold the advancing strip 8 in lateral alignment.

The aligning mechanism C is only effective to retract the stationery a limited distance into registration with the cutting mechanism D. As best shown in Fig. 2, a rock shaft 40 is journalled in the side walls 6 and has a pair of rigidly connected upwardly extending arms 41 which are provided at their upper ends with jogging fingers 42 which are urged upwardly by tension springs 43. When the arms 41 are rocked forwardly, the fingers will bear against and be withdrawn below the table, but when the arms rock rearwardly, the fingers will be projected up through a slot in the table into engagement with the rear edge portion of register perforations 44 and serve to retract the stationery into alignment.

As shown in Figs. 1 and 4, the outer end of the shaft 40 is provided with a rock arm 45 which is provided with a roller 46 which rides on a cam 47 secured to the power shaft 11 by means of a set screw 48. The cutting mechanism D is of the rotary self-sharpening type. A heavy steel blade 49 provided with a shearing edge portion 50, is mounted on the upper end of rock members 51 which are pivotally mounted on pins 52 and have downwardly extending arms 53 which are drawn rearwardly by tension springs 54. The springs 54 urge the shearing edge 50 into contact with the rotary blade and the slight wear keeps the two knife edges sharp.

A rock shaft 55 has a cam portion 56 adapted to engage the arms 53 and rock the blade 49 out of engagement with the rotary knife when the handle 57 is given a partial rotation. As shown in Fig. 4, the movement of the arm 57 is limited by a pin 58 working in a slot 59 of the handle. The purpose of this release is to enable the operator to prevent severance of certain lengths of the strip, if desired, while feeding the continuous strip through the cutter. When the blade 49 is turned out of engagement with the cutter blade, no shearing will occur.

The rotary cutter 60 has trunnions 61 journalled in the side walls of the machine and is provided with a driving gear 62 by which the member may be oscillated. The cutter 60 has a circumferential shearing edge 63 which is V-shaped so as to shear the underlying strip progressively from both edges to the center. While most of the body of the knife is cut away, the hub portions 64 ride against the blade 49 and prevent interference. The rotary cutter blade is oscillated by a cam groove 65 provided in the cam wheel 17. A rock arm 66 is pivotally mounted on the side wall of the machine, as indicated at 67, and is provided at one end with a roller 68 travelling in the cam groove 65, and has at the other end a segmental gear 69 which meshes with the gear 62. Thus it will be understood that when the cam wheel 17 is rotated the arm 66 will be rocked and will cause the rotary cutter to oscillate.

It may be noted that with the present construction, the stationery is not under tension during the cutting operation and in order to hold the strip firmly while being sheared, the presser mechanism E is provided. This mechanism has a cross bar 70 mounted to reciprocate in slots 71 and is urged downwardly into contact with the stationery by means of tension springs 72. The bar is held in its upper position, except during the cutting operation, by means of arms 73 which are secured to a rock shaft 74 and have their rear ends extending through slots 75 provided in the ends of the presser bar 70. The shaft 74 is provided with an L-shaped operating arm 76 which bears against the upper end of the rock arm 66 so as to be operated in timed relation to the movement of the knife.

It is not desirable for pay checks, and the like, to have register perforations in the body of the form. Accordingly, the perforations 44 are usually arranged on lines of weakening 8a which also form the fold lines for the packet 7. To load the machine the hand wheel 18 is turned sufficiently to separate the feed rollers and the strip 8 is led up over a rear guide roll 77 over the platen to the front of the machine. The first set of perforations may then be brought into engagement with the fingers 44 and the device is ready for operation. Upon the application of power, the arms 41 will rock the register-fingers forwardly out of the way and the feed-mechanism will advance the strip 8 slightly more than one form length beyond the shearing edge 50. At this time the upper roller will be raised with the action of cam 17 on the arm 28 and the fingers 42 will be rocked rearwardly so as to project up into the register perforations and retract the strip so that the line of weakening 8a of the advanced form will be brought into exact registration with the shearing edge 50. The cam slot 65 will then cause the rock arm 66 to be lowered, permitting the clamping bar 70 to grip the stationery and causing the rotary cutter 60 to oscillate and shear off the strip. These operations are continued in timed relation until the entire strip 8 has passed through the machine.

The foregoing detailed description has been given for clearness of understanding only, and no unnecessary limitations should be understood therefrom, but the appended claims should be construed as broadly as permissible, in view of the prior art.

I claim:

1. In a machine of the character set forth: a table over which a strip of stationery may be led; a knife edge at the front of said table; feed-mechanism for advancing said strip over said table and more than a predetermined length of strip beyond said knife edge; aligning means for retracting said strip until only the predetermined length is beyond the knife edge; a transversely disposed rotary knife cooperating with said knife edge to shear off said predetermined length of strip; and means for operating said feed-mechanism, aligning mechanism, and rotary knife automatically in timed relation.

2. A device as specified in claim 1, including means in which the knife edge portion is pivotally mounted for limited movement in the direction of travel of the strip, a spring is provided for urging the knife edge into contact with the rotary knife so as to sharpen the same, and manually operable means is provided for holding the knife edge out of contact with the rotary knife so as to render it inoperative to shear the strip.

3. A device as specified in claim 1, including a vertically reciprocable presser bar for gripping the strip adjacent to the knife edge, and means to operate said bar in timed relation to the movement of the rotary knife.

4. In a machine of the character set forth: a table over which a strip of stationery may be led; a knife edge at the front of said table; feed-mechanism for advancing said strip over said table and more than a predetermined length of strip beyond said knife edge; friction-members disposed above said table and adapted to press the stationery lightly against the same; a normally retracted register-finger beneath said table adapted to project upwardly therethrough to engage the stationery at perforations provided therein and retract the strip until only the predetermined length projects beyond the knife edge; a transversely disposed oscillatable knife cooperating with said knife edge to shear off said length of strip; and means for operating said feed-mechanism, register-fingers and oscillatable knife in timed relation automatically.

5. A device as specified in claim 4, in which the oscillatable knife has a circumferential shearing edge disposed so as to cut the strip progressively from both edges towards the center.

6. A device as specified in claim 4, in which the operating means comprises a power driven shaft provided with a cam for oscillating the register-fingers, a gear train for driving feed rolls in the feed-mechanism, and a cam slot for rocking a segmental gear member which is in mesh with a gear on the shaft of the oscillatable knife.

7. In a machine of the character set forth: a cut-off device for cutting a strip of stationery into predetermined lengths, said device having upper and lower shearing edges; feed-mechanism for advancing said strip of stationery more than one form-length beyond the lower shearing edge of said device; aligning mechanism disposed in rear of said feed mechanism and having a finger for engaging a perforation in the strip and retracting said strip to one form-length beyond said shearing edge; and driving mechanism for operating said mechanism and cut-off device in timed relation.

LOUIS JENSEN.